US008066257B2

(12) United States Patent
Arov et al.

(10) Patent No.: US 8,066,257 B2
(45) Date of Patent: Nov. 29, 2011

(54) FAUCET WITH FLOATING SEAL MEMBER

(76) Inventors: Gennady Arov, Bayside, WI (US); John M. Strobel, West Allis, WI (US)

( * ) Notice: Subject to any disclaimer, the term of this patent is extended or adjusted under 35 U.S.C. 154(b) by 1049 days.

(21) Appl. No.: 11/358,739

(22) Filed: Feb. 21, 2006

(65) Prior Publication Data

US 2007/0194264 A1    Aug. 23, 2007

(51) Int. Cl.
*F16K 31/44* (2006.01)
(52) U.S. Cl. .................... 251/231; 251/299; 251/301
(58) Field of Classification Search .................. 222/501, 222/509, 559; 251/297, 298, 299, 303, 231, 251/300, 301, 359–361
See application file for complete search history.

(56) References Cited

U.S. PATENT DOCUMENTS

| | | | |
|---|---|---|---|
| 516,438 A | 3/1894 | Hurst et al. | |
| 1,077,387 A | 11/1913 | Beggs | |
| 2,057,231 A | 10/1936 | Dawson | |
| 2,169,393 A | 8/1939 | Rice | |
| 2,262,062 A * | 11/1941 | Strong | 251/298 |
| 2,627,388 A * | 2/1953 | Johnson et al. | 137/113 |
| 3,096,001 A | 7/1963 | Boe et al. | |
| 3,386,700 A | 6/1968 | Greene et al. | |
| 3,420,418 A * | 1/1969 | Bennett et al. | 222/399 |
| 4,291,821 A * | 9/1981 | Nezworski | 222/153.04 |
| 4,621,750 A * | 11/1986 | Roethel | 222/505 |
| 4,685,598 A | 8/1987 | Nezworski | |
| 4,711,376 A | 12/1987 | Manfroni | |
| 4,720,076 A | 1/1988 | Hyde | |
| 4,742,942 A | 5/1988 | Dokos et al. | |
| 4,850,388 A | 7/1989 | Shepherd | |
| 4,942,976 A | 7/1990 | Spencer | |
| 5,176,298 A * | 1/1993 | Mogler et al. | 222/400.7 |
| 5,690,136 A | 11/1997 | Celli | |
| 5,794,823 A | 8/1998 | Roundtree | |
| 6,109,485 A | 8/2000 | Amidzich | |
| 6,435,382 B1 | 8/2002 | Giblin | |
| 6,457,614 B1 | 10/2002 | Amidzich | |
| 6,626,420 B2 * | 9/2003 | Amidzich | 251/231 |
| 6,736,159 B2 * | 5/2004 | Becker | 137/375 |
| 7,278,454 B2 * | 10/2007 | Younkle | 141/374 |
| 2004/0177893 A1 | 9/2004 | Younkle | |

FOREIGN PATENT DOCUMENTS

| | | | |
|---|---|---|---|
| GB | 1522295 | | 8/1978 |
| GB | 2247881 A | * | 3/1992 |
| SU | 1726885 | | 4/1992 |

OTHER PUBLICATIONS

Office Action issued Apr. 2, 2011 for Russian patent application 2008134010106. Search Report and Written Opinion mailed Sep. 10, 2008, for PCT/US07/62504.
Notification of Transmittal of International Preliminary Report on Patentability mailed May 14, 2009, for PCT/US07/62504.

* cited by examiner

*Primary Examiner* — John Fristoe, Jr.
*Assistant Examiner* — Marina Tietjen
(74) *Attorney, Agent, or Firm* — Nicholas A. Kees; Godfrey & Kahn, S.C.

(57) ABSTRACT

A liquid dispensing faucet including a flow control lever engaging a sealing member within an internal cavity of a faucet body. The sealing member is held within the faucet body in an oversized recess permitting liquid to flow about all sides of the sealing member when the flow control handle is placed in an open position and liquid flows through the faucet body. The faucet body may have a removable spout mounted at a second end of the body. An air inlet may be included within a flow path of the liquid downstream of the sealing member. This air inlet promotes the removal of residual liquid from the flow path when the flow lever is in a closed position and is positioned to discourage flow of the liquid through the air inlet when the flow lever is in an open position.

18 Claims, 20 Drawing Sheets

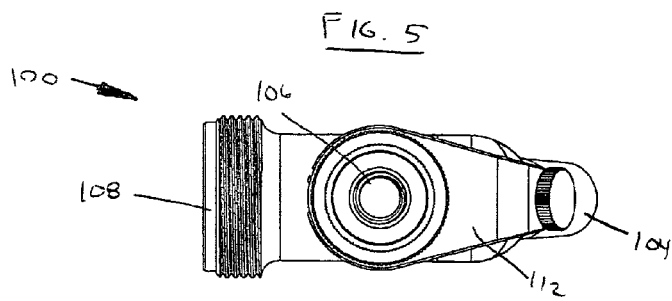
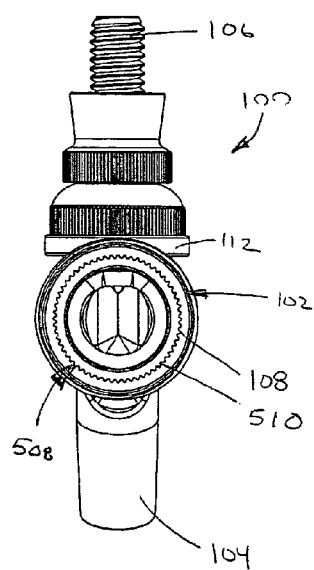
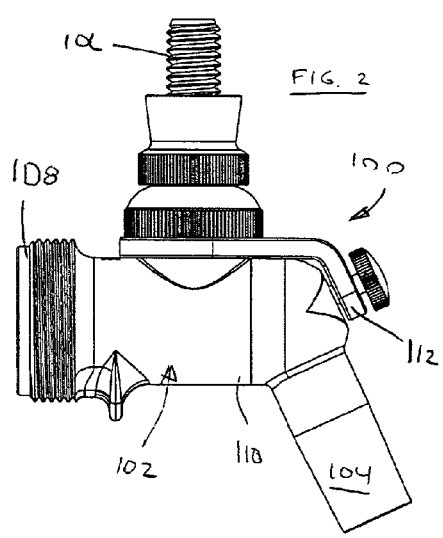
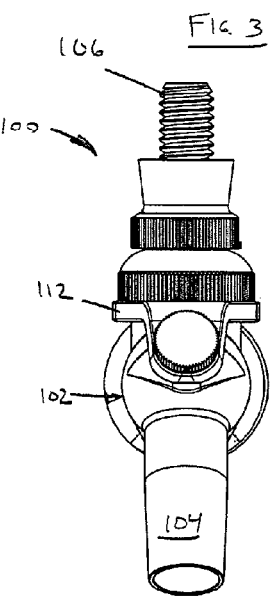
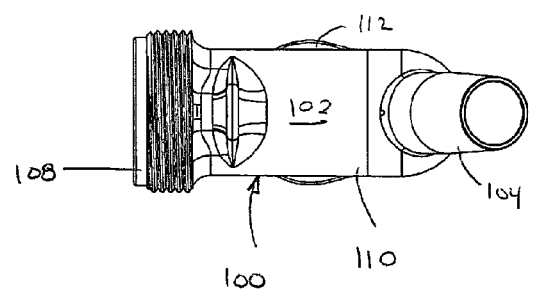

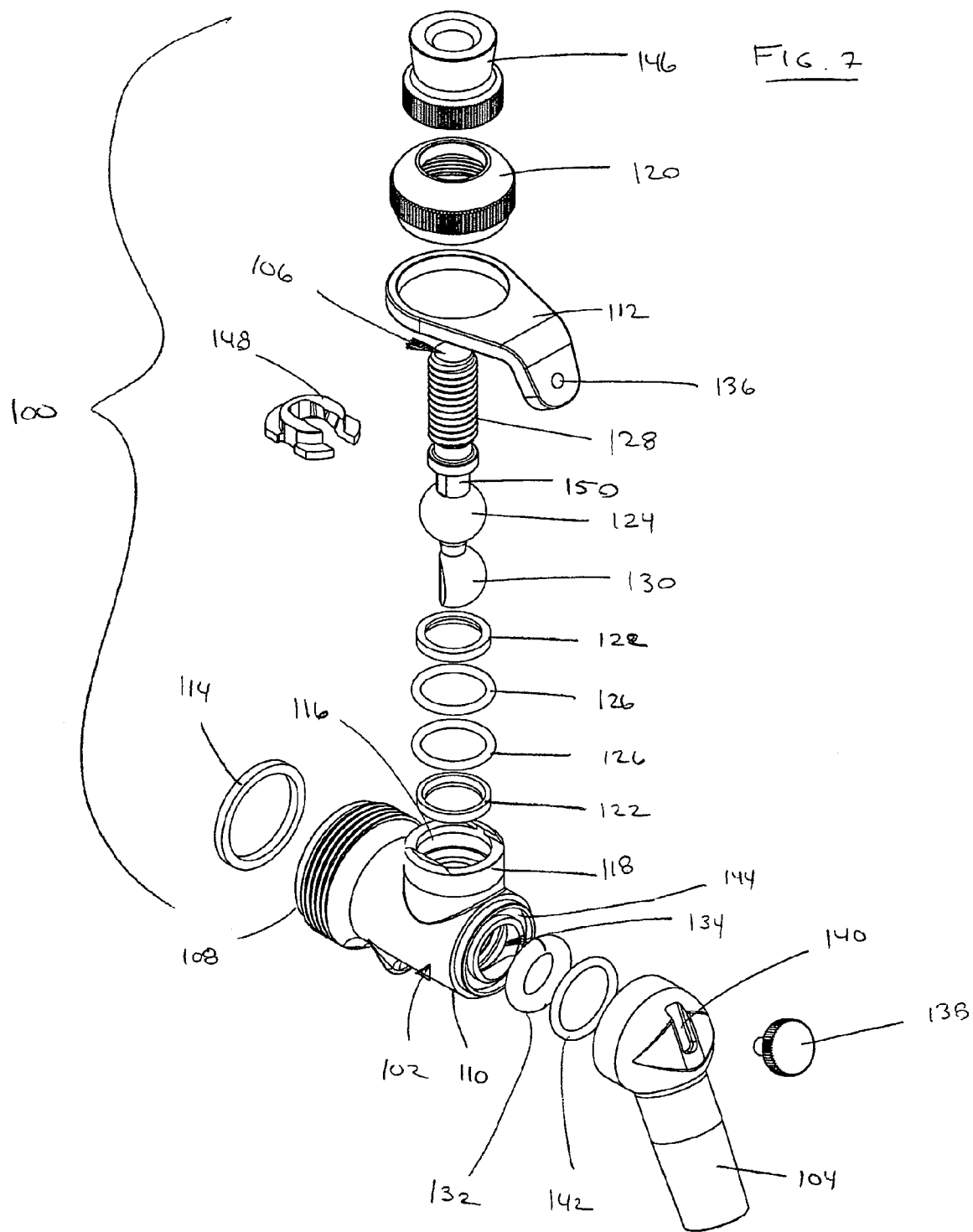

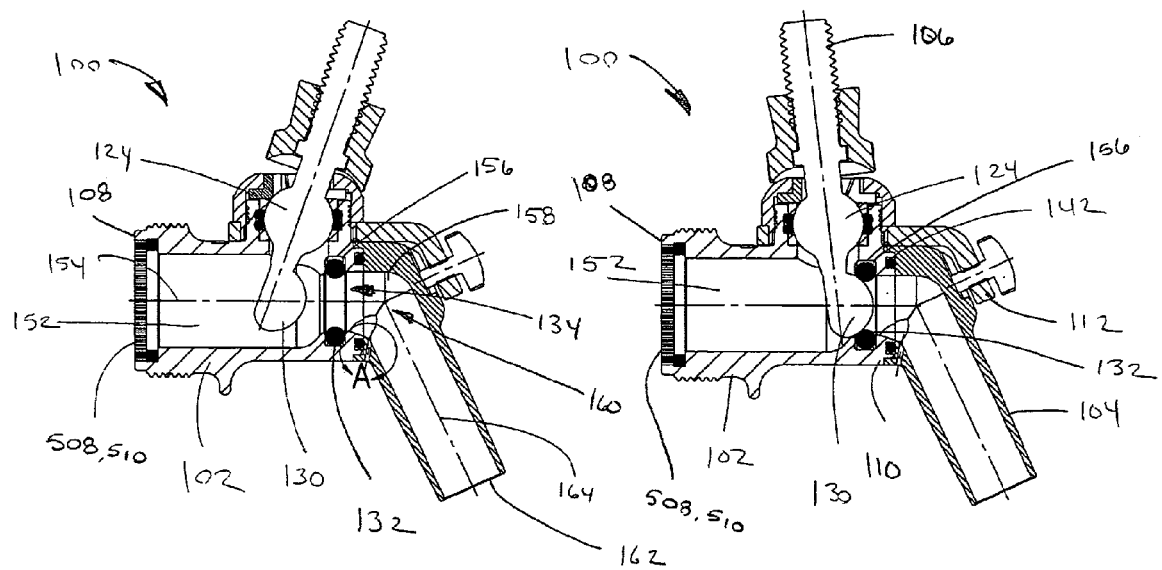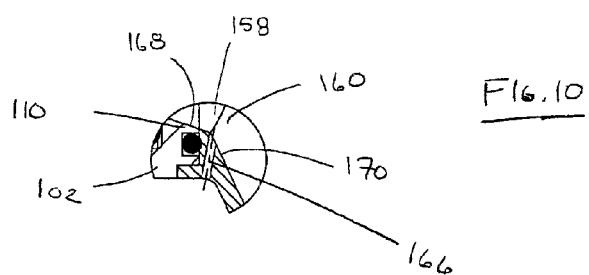

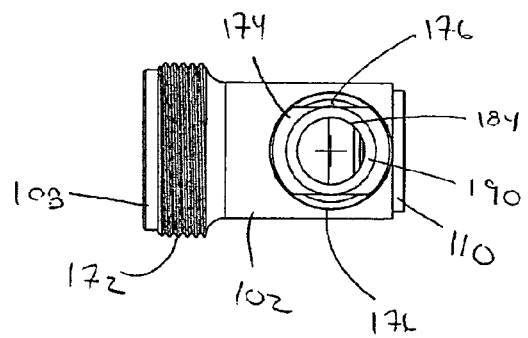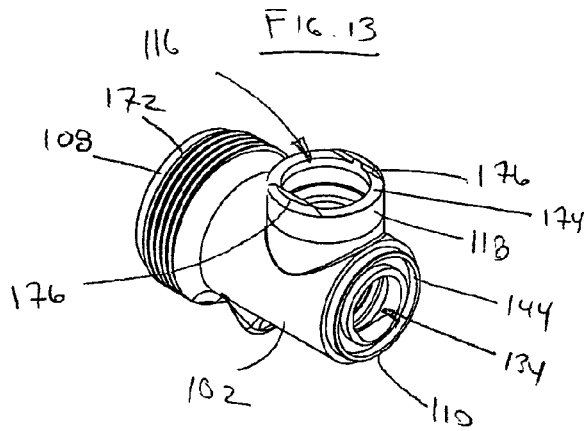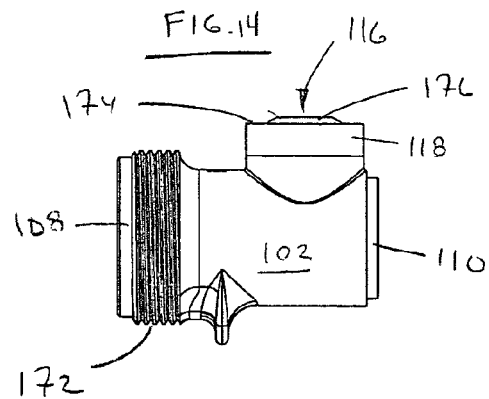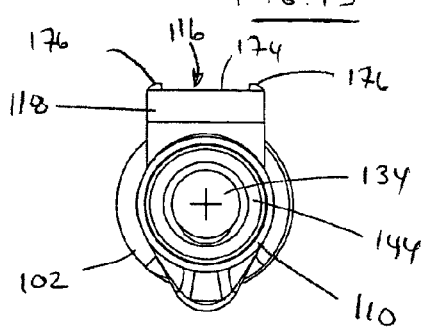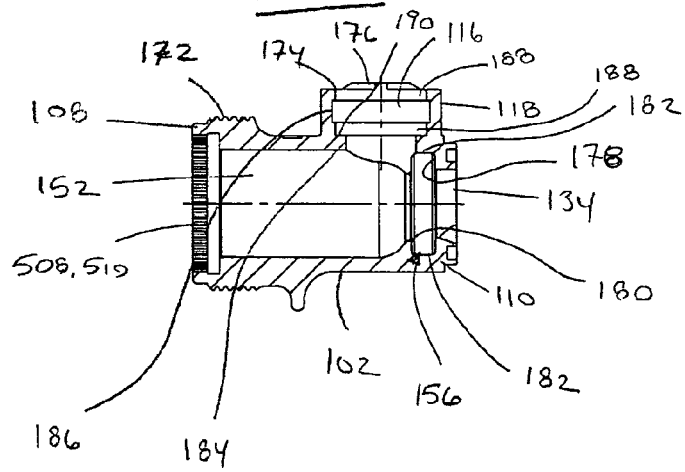

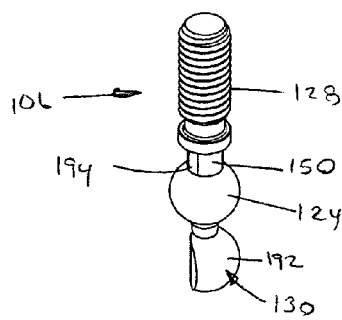
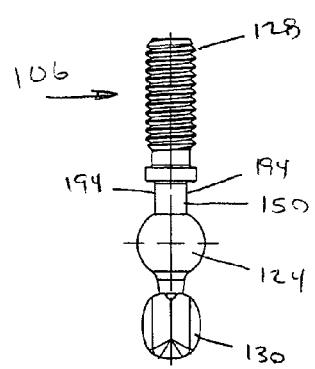
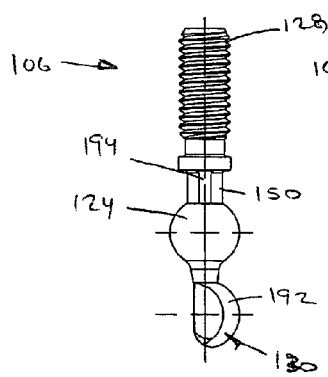
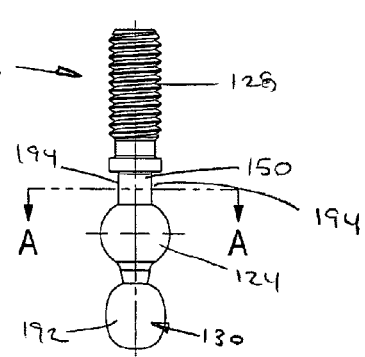
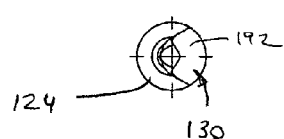
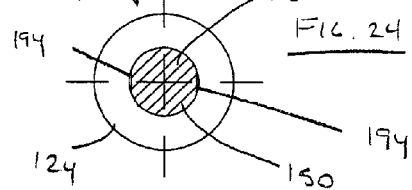

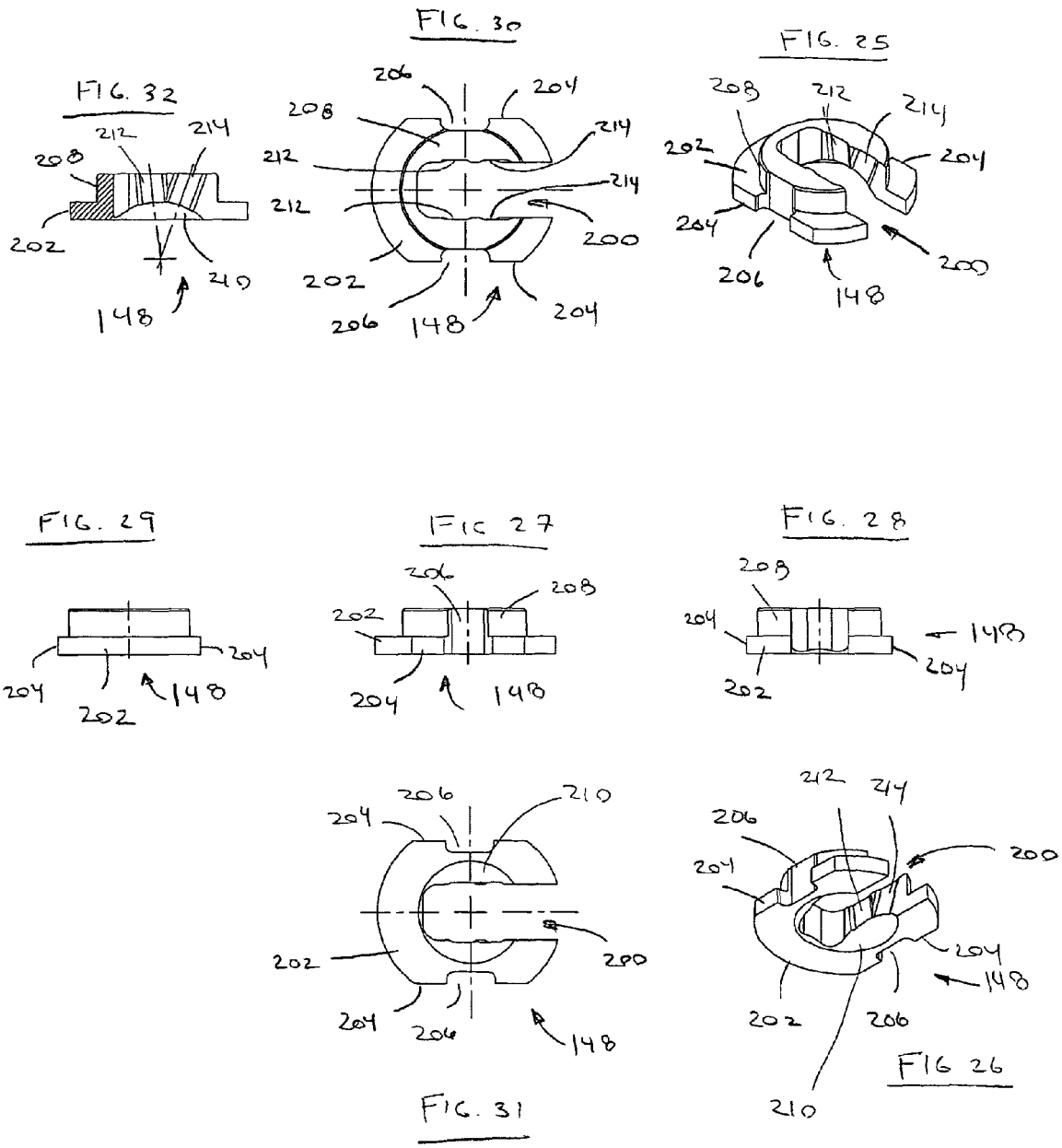

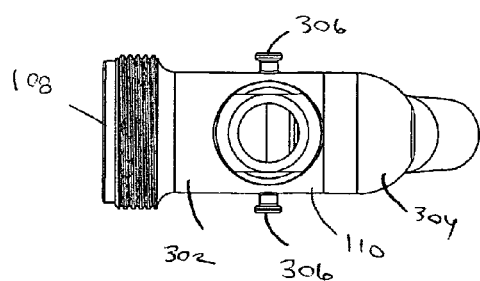
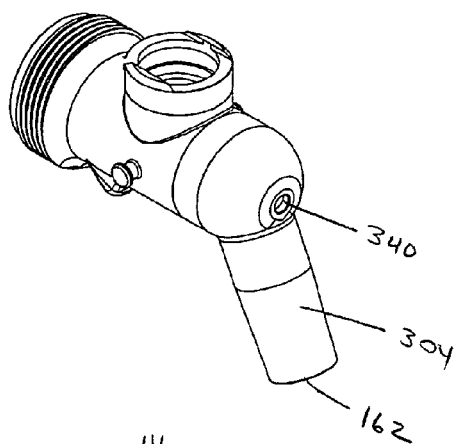
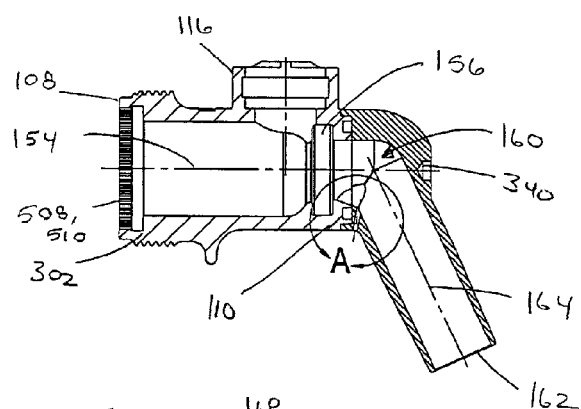
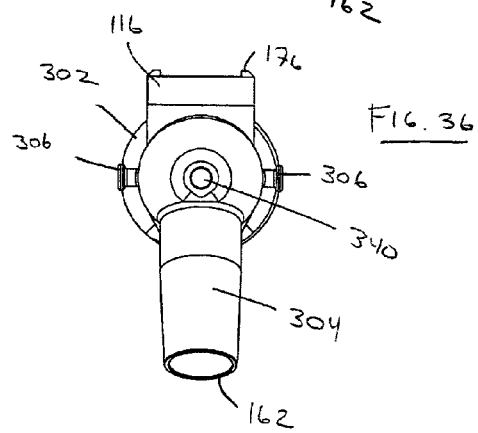
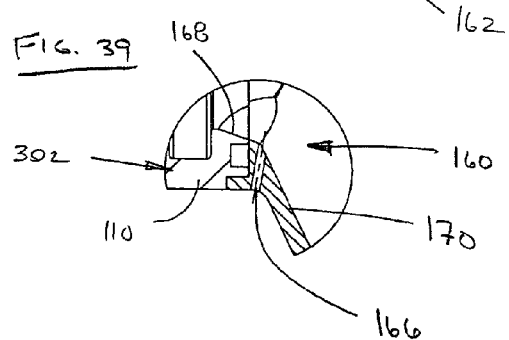

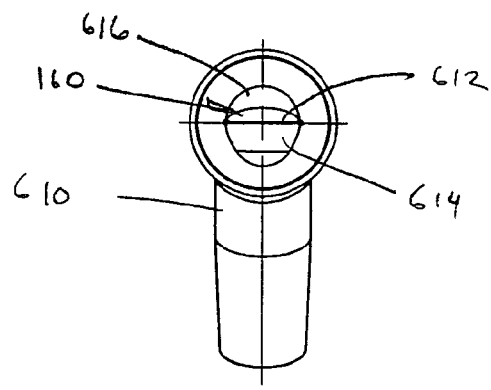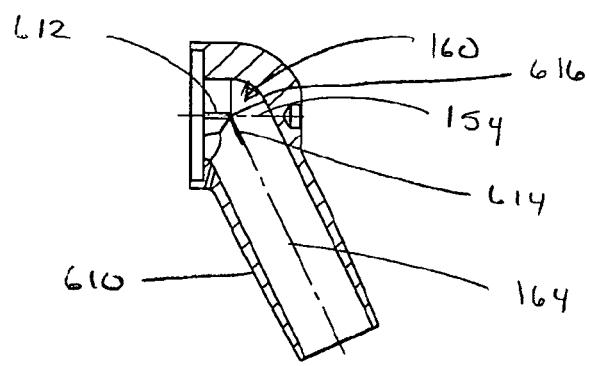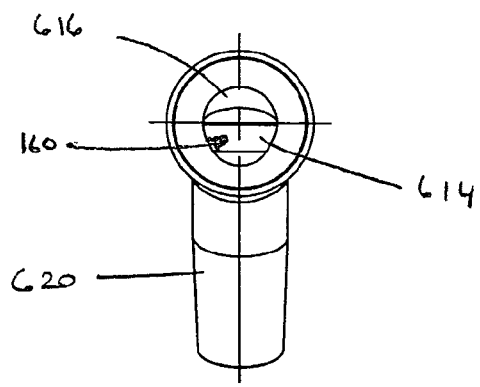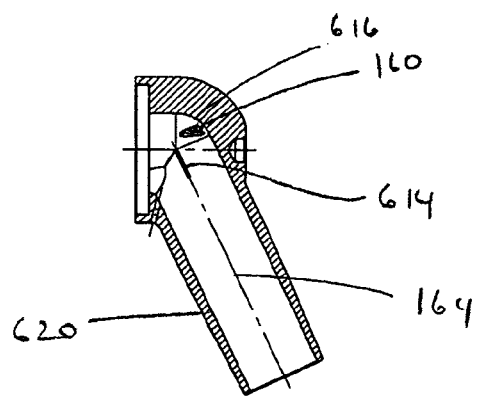

FAUCET WITH FLOATING SEAL MEMBER

BACKGROUND

Conventional faucets for use with pressurized fluids, such as beer taps or other similar devices for dispensing liquids for human consumption, may have an external operating lever which actuates an internal valve to control the dispensing of the fluid under pressure. Within such faucets, there may exist spaces upstream and downstream of the internal valve. The fluids typically dispensed with such faucets may be perishable and prolonged contact with air may destroy the taste or quality of the fluid.

Within such conventional faucets, fluids which are upstream of the internal valve are typically protected from exposure to ambient air, while fluids downstream of the valve may be exposed to ambient air. Fluids downstream of the valve may be residuals clinging to sealing members or other portions of the valve, or they may be trapped by friction or suction within a dispensing spout positioned to direct fluid into a serving container. Fluids trapped about the seals or within the spout may be exposed to ambient air and may provide for the growth of bacteria or other contaminants. Continued dispensing through such a contaminated valve may result in all subsequently dispensed fluid be adversely affected, or even unsanitary for consumption.

It is desirable to improve faucets for dispensing pressurized fluids to aid in the release of trapped fluids that may be exposed to ambient air.

SUMMARY

The present invention relates generally to liquid dispensing faucets, and more specifically relates to a liquid dispensing faucet including a flow control lever engaging a sealing member within an internal cavity of a faucet body. The sealing member is held within the faucet body in an oversized recess permitting liquid to flow about all sides of the sealing member when the flow control handle is placed in an open position and liquid flows through the faucet body. The faucet body may have a removable spout mounted at a second end of the body. An air inlet may be included within a flow path of the liquid downstream of the sealing member. This air inlet promotes the removal of residual liquid from the flow path when the flow lever is in a closed position and is positioned to discourage flow of the liquid through the air inlet when the flow lever is in an open position.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows:

FIG. 2 is a side view of the faucet of FIG. 1.
FIG. 3 is a front view of the faucet of FIG. 1.
FIG. 4 is a rear view of the faucet of FIG. 1.
FIG. 5 is a top view of the faucet of FIG. 1.
FIG. 6 is a bottom view of the faucet of FIG. 1.
FIG. 7 is an exploded perspective view of the faucet of FIG. 1.
FIG. 8 is a side cross-sectional view of the faucet of FIG. 1, with the flow lever is a closed position.
FIG. 9 is a side cross-sectional view of the faucet of FIG. 1, with the flow lever in an open position.
FIG. 10 is a closer view of the portion of the faucet of FIG. 9 within the circle labeled A.
FIG. 13 is a front perspective view of a faucet body of the faucet of FIG. 1.
FIG. 14 is a side view of the faucet body of FIG. 13.
FIG. 15 is a front view of the faucet body of FIG. 13.
FIG. 16 is a top view of the faucet body of FIG. 13.
FIG. 17 is a side cross-sectional view of the faucet body of FIG. 13.
FIG. 18 is a front perspective view of the flow lever of the faucet of FIG. 1.
FIG. 19 is a side view of the flow lever of FIG. 18.
FIG. 20 is a front view of the flow lever of FIG. 18.
FIG. 21 is a rear view of the flow lever of FIG. 18.
FIG. 22 is a top view of the flow lever of FIG. 18.
FIG. 23 is a bottom view of the flow lever of FIG. 18.
FIG. 24 is a cross-sectional view of the flow lever of FIG. 18, taken along line A-A of FIG. 20.
FIG. 25 is a first perspective view of a u-clamp of the faucet of FIG. 1.
FIG. 26 is a second perspective view of the u-clamp of FIG. 25.
FIG. 27 is a side view of the u-clamp of FIG. 25.
FIG. 28 is a front view of the u-clamp of FIG. 25.
FIG. 29 is a rear view of the u-clamp of FIG. 25.
FIG. 30 is a top view of the u-clamp of FIG. 25.
FIG. 31 is a bottom view of the u-clamp of FIG. 25.
FIG. 32 is a side cross-sectional view of the u-clamp of FIG. 25, taken along a centerline of the lever opening.
FIG. 35 is a front perspective view of the faucet body and removable spout of the faucet of FIG. 33.
FIG. 36 is a front view of the faucet body and removable spout of FIG. 35.
FIG. 37 is a top view of the faucet body and removable spout of FIG. 35.
FIG. 38 is a side cross-sectional view of the faucet body and removable spout of FIG. 35.
FIG. 39 is a closer view of the portion of the faucet body and removable spout of FIG. 38 within the circle labeled A.

FIG. 57 is a rear view of a fifth alternative embodiment of a removable spout according to the present invention, with a flow deflector positioned with the transition area of the spout.

FIG. 58 is a side cross-sectional view of the removable spout of FIG. 57.

FIG. 59 is a rear view of a fifth alternative embodiment of a removable spout according to the present invention, with an alternative flow deflector positioned with the transition area of the spout.

FIG. 60 is a side cross-sectional view of the removable spout of FIG. 59.

DETAILED DESCRIPTION

Figure 1:
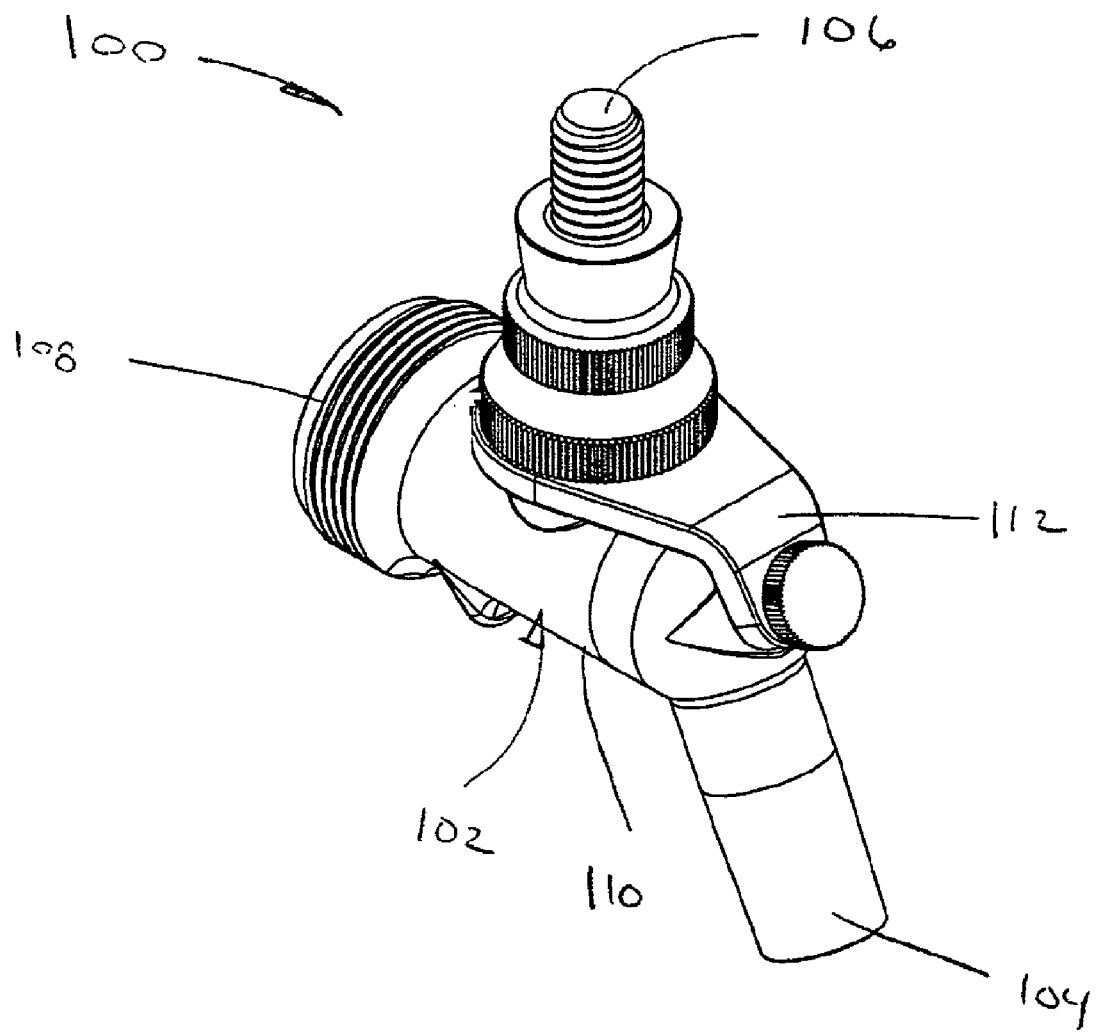
FIG. 1 is a perspective view of a first embodiment of an improved faucet according to the present invention.

Reference will now be made in detail to exemplary aspects of the present invention which are illustrated in the accompanying drawings. Wherever possible, the same reference numbers will be used throughout the drawings to refer to the same or like parts.

Referring now to FIGS. 1 to 7, a liquid dispensing faucet 100 includes a faucet body 102, a dispensing spout 104 and a flow lever 106. As shown, flow lever 106 is in a closed or non-flowing permitting position. In an open or low permitting position (such as shown in FIG. 9, below), flow of a liquid is allowed through faucet body 102 from a liquid source (not shown) attached to a rear end 108 of faucet body 102 through a front end 110 of faucet body 102. Attached to front end 110 is removable dispensing spout 104 which is releasably held to faucet body 102 by spout catch 112.

FIG. 7 illustrates an exploded view of faucet 100 with additional elements shown. Within rear end 108 is a sealing member 114 which provides a seal against leakage between faucet 100 and the liquid source. For example, faucet 100 may be a beer faucet and rear end 108 is connected to a fitting in liquid communication with a pressurized beer keg. Sealing member 114 aids in sealing a connection between faucet body 102 and the fitting connected with the beer keg.

Faucet body 102 includes an upper opening 116 for receiving flow lever 106. An outer portion 118 of upper opening 116 may be threaded to receive an outer cap 120 which serves to hold flow lever 106 within faucet body 102 and also to contain various sealing members or other elements associated with flow lever 102. Among these various sealing members and other elements are upper and lower seals 122 which fit about and captively hold a spherical portion 124 of flow lever 106. One or more sealing members such as o-rings 126 may be held between upper and lower seals 122 and about spherical portion 124 to seal against liquid exiting faucet body 102 through upper opening 118.

Flow lever 106 includes an upper shaft portion 128 which may be threaded or otherwise adapted to receive a separate actuating lever. An upper collar 146 may be threaded about upper shaft portion 128. On an opposite end of flow lever 106 from upper shaft portion 128 is a semi-spherical portion 130 which extends into an inner cavity of faucet body 106 through upper opening 116. Spout 104 is releasably mounted to front end 110 of faucet body 102 by catch 112 which may also include an opening 136 for receiving a thumb screw 138. Spout 104 may include a recess 140 or similar feature designed to engage thumb screw 138 and secure spout 104 to faucet body 102.

Through a front opening 134 of front end 110 of faucet body is a sealing member 132 which engages semi-spherical portion 130 of flow lever 106 to selectively permit or prevent flow of liquid through faucet 100. Front end 110 also may include a sealing member channel 144 which is configured to receive and mate with a sealing member 142 positioned between faucet body 102 and spout 104. A u-clamp 148 is positioned about an intermediate portion 150 of flow lever 106.

Referring now to FIGS. 8 and 9, cross-sectional views from the side of faucet 100 show the position of semi-spherical portion 130 as flow lever 106 is moved from a closed position (FIG. 8) to an open position (FIG. 9). In the closed position, semi-spherical portion 130 engages sealing member 132 within a central flow cavity 152 of faucet body 102. Sealing member 132 is held within an oversized channel 156 generally centered about an axis of flow 154 through cavity 152. When in the closed position, semi-spherical portion 130 traps sealing member 132 against an outer wall of channel 156 and prevent flow of fluid from within cavity 152 into spout 104. In this closed position, sealing member 132 also prevents the flow of air into cavity 152 through front end 110.

As shown in FIG. 9, in the open position, semi-spherical portion 130 no longer engages sealing member 132 and fluid within cavity 152 is free to flow about flow lever 106 through front end 110 and into spout 104. As the fluid within cavity 152 passes through front end 110 through opening 134, it passes into a first end 158 of spout 104, still moving generally parallel to axis 154. It then enters a transition zone 160 and is turned to flow along an axis 164 through spout 104 and out second end 162 of spout 104. Such an arrangement permits faucet body 102 to be mounted to a generally vertical bulkhead or other wall while permitting liquid to flow from spout 104 is a generally desirable downward direction.

The floating arrangement of sealing member 132 within channel 156 permits fluid flowing through front end 110 to pass around all surfaces of sealing member 132, when lever 106 is in the open position. The advantage of this arrangement of sealing member 132 and channel 156 is that this fluid flow about sealing member 132 tends to flush out beer solids or other particulate matter that may have been trapped or solidified adjacent front end 110. The flushing of these particulate materials with each opening of the faucet helps prevent excessive build up of such material and also helps prevent stagnation in areas adjacent to front end 110.

Within transition zone 160 within spout 104, it is desirable to have some way of providing an air inlet that will encourage any residual liquid within spout 104 to drop from second end 162. Without such an air inlet, when flow lever 106 is in the closed position, there is no avenue for air to enter transition zone 160 except from second end 162. Surface tension or other physical properties of the liquid may encourage the fluid to resist dripping through second end 162. This residual liquid within spout 104 may thus be exposed to air but may remain within spout 104. For liquids such as beer or other nutrient rich liquids, this may make the interior of spout 104 a breeding ground for bacteria or other organisms that may be harmful or noxious to persons drinking the fluid.

An air inlet 166 may be included within spout 104 to allow air to enter within spout 104 at a location closely adjacent to front end 110 of faucet body 102 to encourage any residual fluid to flow out of spout 104. To ensure that liquid flowing through faucet 100 is not directed out of air inlet 166, inlet 166 is preferably located within the transition zone 160, along an inner wall. In this location, as liquid is transitioning from flowing generally parallel to axis 154 to flowing generally parallel to axis 164, an eddy or area of lower pressure may be created just beyond a first wall 168 from faucet body 102 turns to meet an inner wall 170 of spout 104. This eddy prevents liquid from flowing out of air inlet 166 when flow lever 106 is in the open position and still permits scavenging air to be introduced within spout 104 adjacent first end 158 when flow lever 106 is in the closed position.

Figure 11:
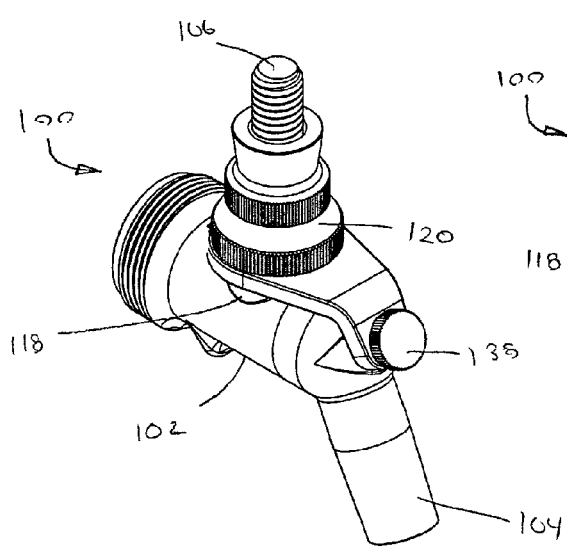
FIG. 11 is a front perspective view of the faucet of FIG. 1, with a catch holding a removable spout in place.
Figure 12:
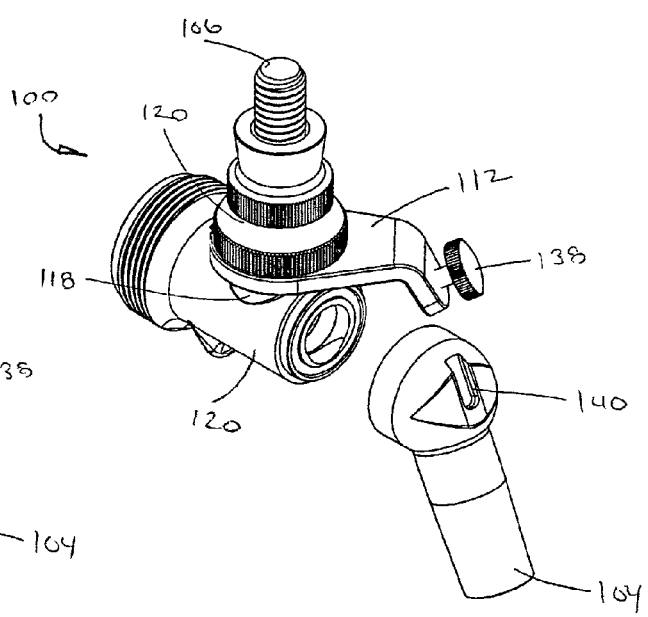
FIG. 12 is a front perspective view of the faucet of FIG. 11, with the catch moved and the removable spout removed from the faucet body.

While air inlet 166 may encourage residual liquid to exit spout 104, it may still be desirable to remove spout 104 for cleaning or replacement. As it is desirable to ensure that air inlet 166, if present, is correctly located, it is desirable to provide for removal and replacement of spout 104 that will result in this correct location. As shown in FIG. 11, catch 112 is rotatably mounted about outer portion 118 of upper opening 116 and held in place by outer cap 120. Thumbscrew 138 extends through catch 112 and engages recess 140. As shown in FIG. 12, to remove or replace spout 104, thumbscrew 138 may be retracted from recess 140 and outer cap 120 loosened about outer portion 118. Catch 112 can then be rotated clear of spout 104 and spout 104 may be removed from faucet body 102. Spout 104 may then be cleaned and replaced, or a new spout can be mounted and secured to faucet body 102 with catch 112.

Referring now to FIGS. 13 to 17, faucet body 102 may include an outer threaded portion adjacent rear end 108 to permit a locking ring or other fastening device to be placed about faucet body 102 to secure the body to a pressurized liquid source. Upper opening 116 may also include a u-clamp seat 174 flanked on either side by a pair of flanges 176. U-clamp 148 may positioned upon seat 174 and held in a particular orientation by flanges 176 about flow lever 106.

Within faucet body 102 is channel 156 where sealing member 132 may be positioned. An outer wall 178 provides a sealing surface for sealing member 132 when semi-spherical portion 130 engages sealing member 132 in the closed position. An opposing inner wall 180 is positioned inset from outer wall 178 preferably a distance greater than an uncompressed thickness of sealing member 132. Additionally, an annular surface 182 within channel 156 is preferably greater in diameter than an uncompressed diameter of sealing member 132. Inner and outer walls 180 and 178, respectively, are preferably sized to captively engage sealing member 132 in an uncompressed condition so that sealing member 132 will be ejected from within faucet body 102. However, it is also preferable that channel 156 be oversized enough with respect to the uncompressed size of sealing member 132 to permit liquid flowing though faucet body 102 and into spout 104 to flow about all sides or surfaces of sealing member 132. Such an arrangement may help flush out otherwise dead flow areas about opening 134 where liquid may stagnant and permit bacteria growth or other undesirable conditions.

Within upper opening 116, generally concentric openings 184 and 186, of different diameters may be formed to permit insertion and capture of flow lever 106. Opening 186 provides a space for receiving spherical portion 124 of flow lever 106 and sealing members 126. Smaller diameter spaces 188 above and below opening 186 provide spaces for receiving upper and lower seals 122. Opening 184 is smaller in diameter than either spherical portion opening 186 and seal opening 188 and provides an opening for entry of semi-spherical portion 130 into cavity 152 adjacent front opening 134. These generally concentric openings provide for insertion of flow lever into faucet body 102 as well as a surface 190 against which to mount seals 122 and sealing members 126 under cap 120.

Referring now to FIGS. 18 to 24, flow lever 106 includes semi-spherical portion 132 having a face with a diameter generally equal to the diameter of spherical portion 124. It is desirable to have as great a diameter of semi-spherical portion 130 to permit as large a diameter of opening 134 between faucet body 102 and spout 104. The larger the opening, the greater the amount of liquid that can flow through faucet 100 for a given pressure being applied to the liquid. However, the desire to have a smaller diameter surface 190 within upper opening 116 for lower seal 122, might indicate that portion 130 be smaller in diameter that portion 124. By relieving portion 130 as shown in FIG. 18 to 24, semi-spherical portion 130 can be made to fit within the smaller diameter opening 184 while still providing as large a diameter as possible for engaging sealing member 132 and closing opening 134. Relieving portion 130 also provides an added advantage of providing less of an obstacle to flow along axis 154 and through opening 134. While a sealing surface 192 of portion 130 is shown with generally the same diameter as spherical portion 124, this is merely for convenience. The relative diameters of the spherical portion 124 and sealing surface 192 of semi-spherical portion 130 can be adapted as desired.

Intermediate portion 150 is positioned between spherical portion 124 and threaded portion 128 and may include a pair of opposing flats 194. These flats may engage detent features of u-clamp 148, described below.

Referring now to FIGS. 25 to 32, u-clamp 148 includes a slot 200 through which intermediate portion 150 of flow lever 106 is received. U-clamp 148 also includes a generally circumferential ring portion 202 which may include flats 204 along opposite sides. When u-clamp 148 is positioned on upper opening 116 of faucet body 102, flats 204 are configured to engage flanges 176 to orient u-clamp 148 as desired and to prevent rotation of u-clamp 148. Within each flat 204 a recess 206 may be included which may extend across ring portion 202 and into a center raised portion 208. On an underside of center portion 208 may be formed a spherical recess 210 within which an upper surface of spherical portion 124 of flow lever 106 may be received (as shown in FIG. 7).

Within slot 200 may be a first pair of detents 212 and a second pair of detents 214. These detents are configured to engage flats 194 of intermediate portion 150 of flow lever 106. Detents 212 are positioned to correspond to the closed position of flow lever 106, as shown in FIG. 8, and detents 214 are positioned to correspond to the open position of flow lever 106, as shown in FIG. 9. It is preferable that u-clamp 148 be formed of a resilient deformable material so that movement of flow lever 106 between the open and closed positions will force u-clamp 148 to deform outward as intermediate portion 150 moves within slot 200 and will spring back into shape to captively hold flow lever 126 in the desired position. Recesses 206 in ring portion 202 and center portion 208 may provide an area on either side of u-clamp 148 for material displaced by such deformation to move into as flow lever 106 is moved between positions. The nature of the material from which u-clamp 148 is formed may remove the need for such recesses.

Figure 33:
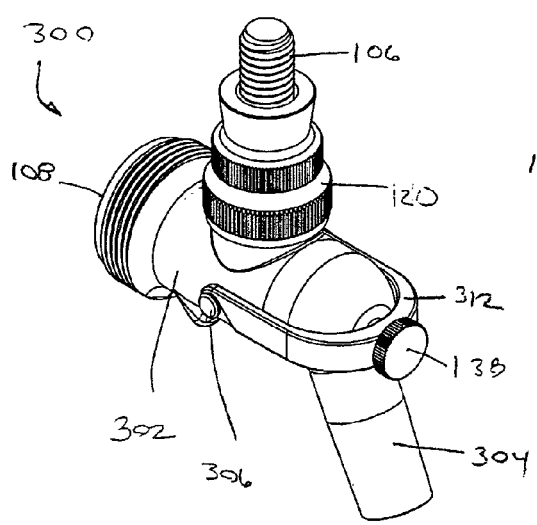
FIG. 33 is a perspective view of an alternative embodiment of a faucet according to the present invention, with a catch holding an alternative embodiment of a removable spout in place.
Figure 34:
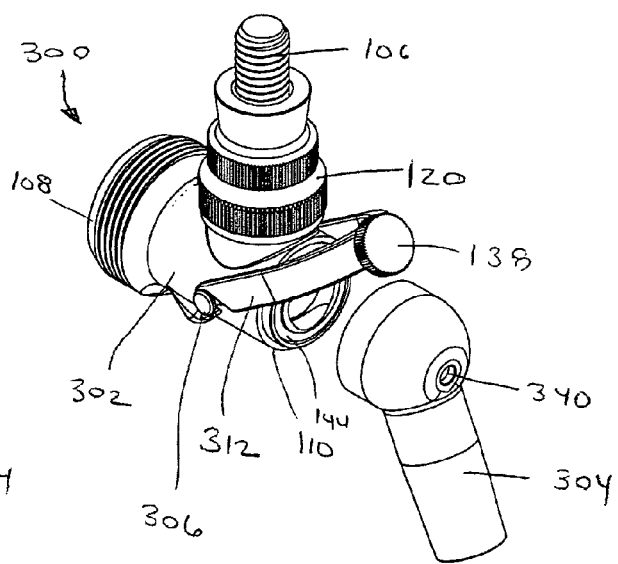
FIG. 34 is a perspective view of the faucet of FIG. 33, with the catch moved and the removable spout removed from the body.
Figure 40:
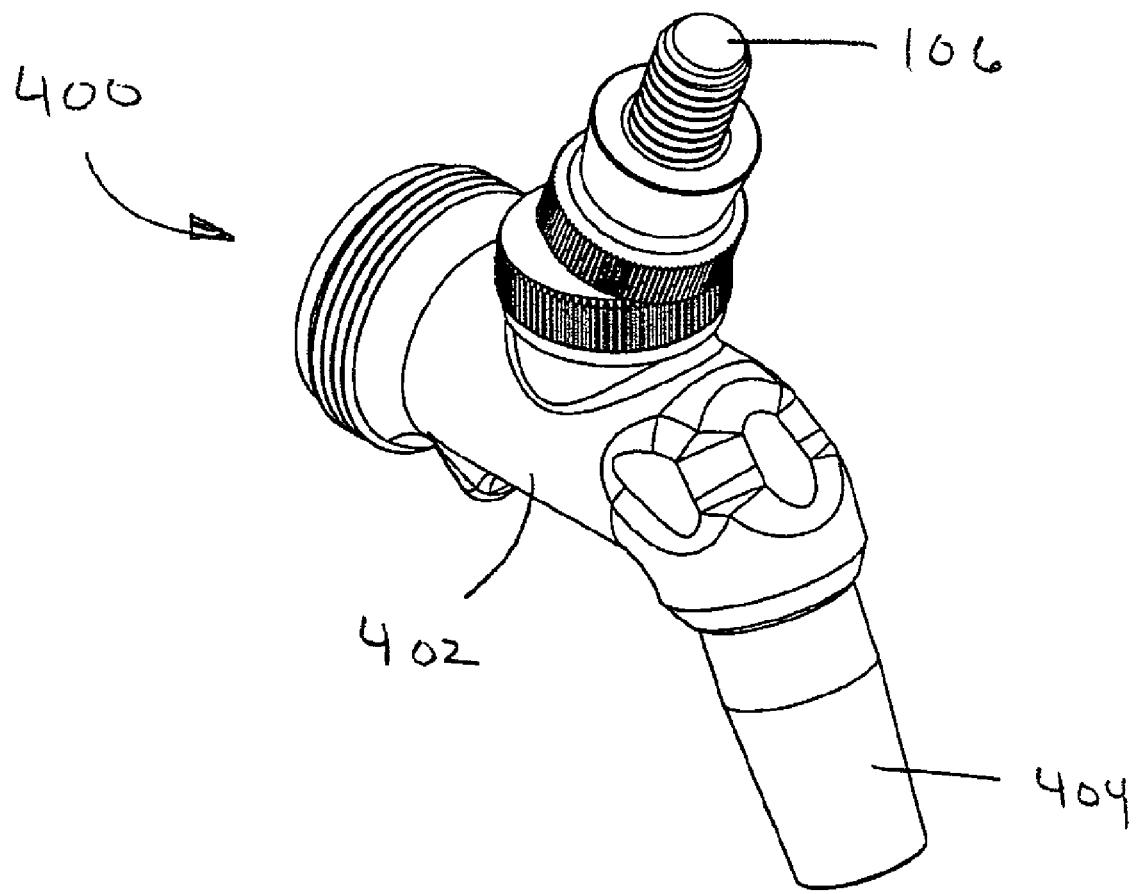
FIG. 40 is perspective view of a second alternative embodiment of a faucet according to the present invention, with a second alternative embodiment of a removable spout threaded into a faucet body.
Figure 41:
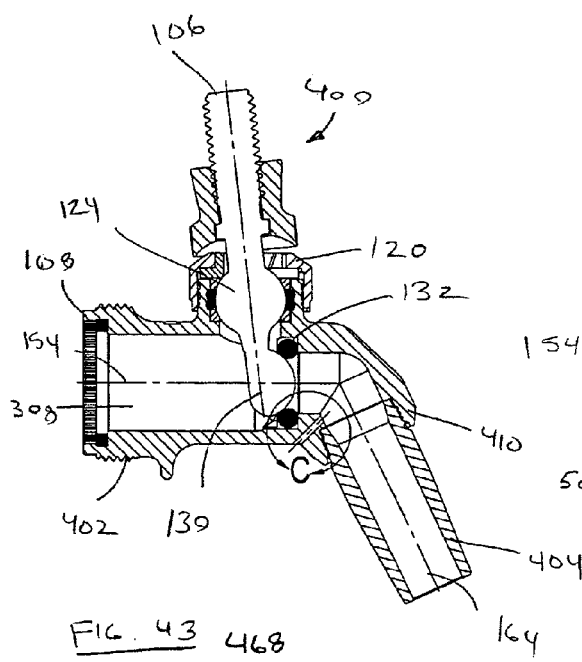
FIG. 41 is a side cross-sectional view of the faucet of FIG. 40, with the flow lever is a closed position.
Figure 42:
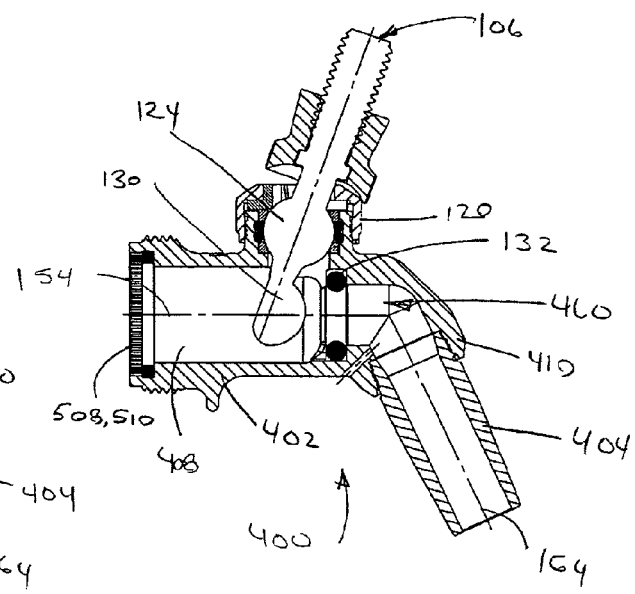
FIG. 42 is a side cross-sectional view of the faucet of FIG. 40, with the flow lever in an open position.
Figure 43:
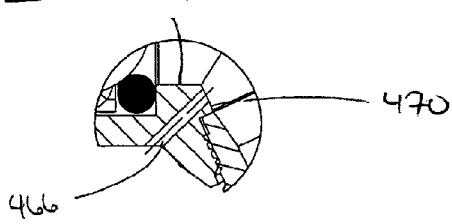
FIG. 43 is a closer view of the portion of the faucet of FIG. 43 within the circle labeled C.

Referring now to FIGS. 33 and 34, an alternative approach to releasably mounting an alternative removable spout 304 to an alternative faucet body 302 of an alternative faucet 300 is shown. A catch 312 is rotatably mounted to faucet body 302 at a pair of opposing pins 306 in the side of faucet body 302. Faucet body 302 is similarly configured to faucet body 102 with the exception of the provision for use of catch 312 in place of catch 112. Spout 304 includes a recess 340 to receive thumbscrew 138. To remove spout 304 from faucet body 302, thumbscrew 138 is retracted from recess 340 and catch 312 rotated upward away form spout 304. Spout 304 can then be removed from body 302. Spout 304 is configured similarly to spout 104 with the exception of the nature of interfacing with the spout catch. A sealing member 142 (not shown) may be positioned between faucet body 302 and spout 304 and received within channel 144 of body 302.

Referring now also to FIGS. 35 to 39, faucet body 302 and spout 304 are shown with internal features similarly configured to faucet body 102 and spout 104. Spout 304 includes air inlet 166 similarly positioned along inner wall 170 within transition portion 160 where liquid flow within spout 304 is transitioned from flow generally parallel to axis 154 to flow generally parallel to axis 164 of spout 304. As shown, with the exception of the nature of the spout catch and corresponding external features, the configuration of spout 304 and faucet body 302 are functionally identical to spout 104 and faucet body 102.

Referring now to FIGS. 40 to 43, a second alternative embodiment of a faucet 400 includes a faucet body 402 and a removable spout 404. Flow lever 106 is also included with faucet 400. Faucet body 402 differs from the prior faucet bodies disclosed above in that faucet body 402 includes flow transition portion 460 within an internal flow cavity 408. In this transition portion 460, liquid is transitioned from flowing generally parallel to axis 154 to flowing generally parallel to axis 164, similar to that which is described above, with a difference being that the transition is occurring within faucet body 402 instead of within spout 404. Similarly, an air inlet 466 is positioned within transition portion 460 along an inner wall 470 generally parallel to axis 164 and downstream from an inner wall 468 generally parallel to axis 154.

Other internal features of faucet body 402 are similar to features of the faucet bodies described above, with regard to the interface and relationship between flow lever 106 and sealing member 132 within cavity 408. Spout 404 may be a conventional spout threadably mounted to faucet body 402, permitting users to adopt use of a faucet body and other elements according to the present invention and be able to use some conventional equipment.

Figure 44:
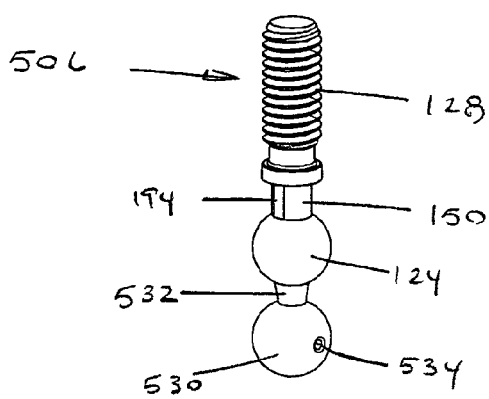
FIG. 44 is a perspective view of an alternative embodiment of a flow lever according to the present invention.
Figure 45:
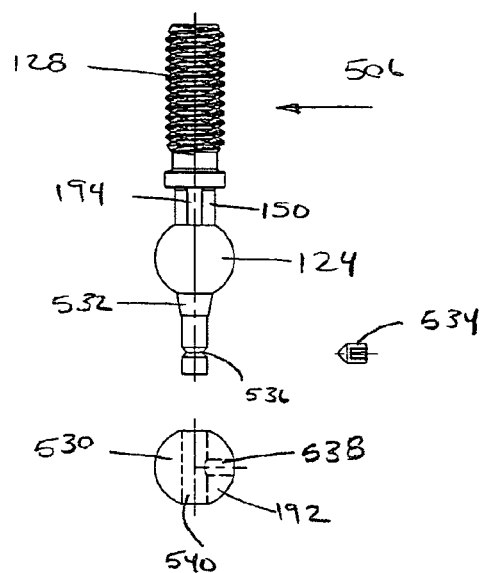
FIG. 45 is an exploded side view of the flow lever of FIG. 44.

FIGS. 44 and 45 show an alternative flow lever 506 with spherical portion 124 and a removable lower spherical portion 530. Whereas flow lever 106 includes a semi-spherical portion 130 which is reduced in cross-sectional to fit through an opening in upper opening 116 in cavity 134 or 408, flow lever 506 provides a different approach to permitting insertion into such internal cavities. Lower spherical portion 530 is removably mounted to a lower stem 532 of lever 506 and may be held in place by a removable fastener, such as set screw 534. Lower stem 532 may include a recess 536 to engage the removable fastener such as set screw 534 or set screw 534 may engage lower stem 532 by creating a deformation or dent in an outer surface of lower stem 532.

To position flow lever 506 within one of the faucet bodies shown above, lower spherical portion 530 is removed from lower stem 532 by loosening set screw 534 within a set screw opening 538 (shown in dashed lines in FIG. 45). Lower stem 532 is inserted through upper opening 116 in the internal cavity and lower spherical portion is inserted into the same cavity through rear end 108. Lower stem 532 is inserted within a stem opening 540 (shown in dashed lines in FIG. 45) of lower spherical portion 530. Set screw 534 is accessed through one of the front or rear ends of the faucet body and advanced until engaging recess 536 or the surface of lower stem 532. Once lower spherical portion 530 is secured to flow lever 506, flow lever 506 can be oriented as desired within opening 116 and u-clamp 148 positioned about intermediate portion 150 engaging flats 194.

Figure 46:
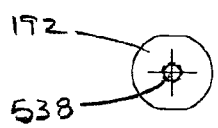
FIG. 46 is an end view of a removable spherical portion of the flow lever of FIG. 44.
Figure 47:
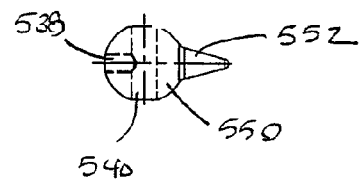
FIG. 47 is a side view of an alternative embodiment of a removable lower portion for use with the flow lever of FIG. 44.

It is known that a shape approaching that of a teardrop, with a rounded upstream end and a longer tapered downstream end, permits smoother, less turbulent flow of a fluid about an object. Smoother flow within any of the faucet bodies according to the present invention may be achieved within the use of a lower portion shaped like that of lower portion 630, shown in FIGS. 46 and 47. Lower portion 630 includes sealing surface 192 to permit opening and closing of a faucet in coordination with sealing member 132, similar to that described above. However, an extended tapered portion 552 extends generally opposite from sealing surface 192 and provides shape in flow of fluid through a faucet which may have less turbulence and thus reduce foaming of the dispensed fluid. As shown, lower portion 630 is adapted for use with flow lever 506, and may be removably mounted to lower stem 532. Alternatively, lower spherical portions shaped similarly to lower portion 630 may be included in the various flow levers disclosed herein.

Figure 48:
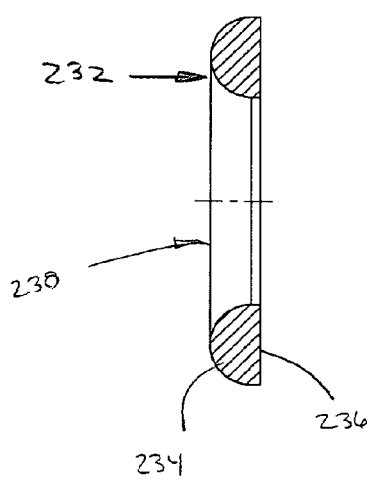
FIG. 48 is a side cross-sectional view of a circumferential floating seal according to the present invention.
Figure 49:
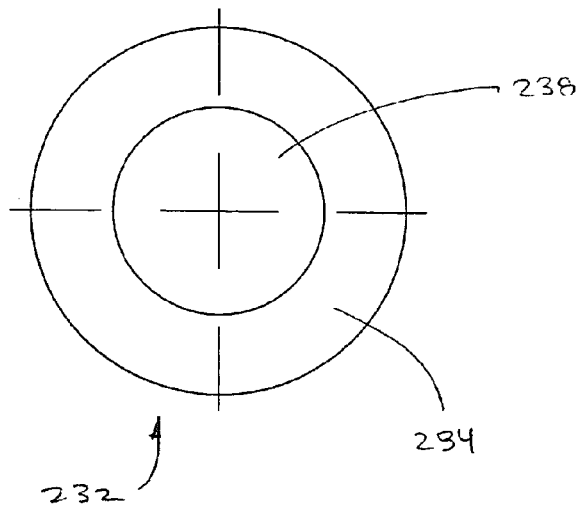
FIG. 49 is an end view of the floating seal of FIG. 48.

FIGS. 48 and 49 illustrate an alternative embodiment of a sealing member 232 with a rounded front sealing face 234 for engaging sealing surface 192 of a flow lever and an opposite flat rear face 236. While sealing member 132 is shown as generally round in cross-section (see FIGS. 7 to 9, above) only one side of sealing member 132 engages sealing surface 192. The opposite side of sealing member 132 is resting against a generally flat outer wall 178 of recess 156. Beer solids and other precipitates may collect between sealing member 132 and the wall of recess 156. While flow of fluid about all sides of sealing member 132 may aid in the flushing of such materials from about sealing member 132, alternative designs may be desirable for sealing member 132. Sealing member 232 includes one such alternative design. Sealing member 132 presents a rounded surface to outer wall 178 and forms a generally narrow seal between the generally round surface and outer wall 178. Any precipitates or other materials that do gather in this location may damage the ability of sealing member 132 to provide a tight seal. Not all fluids to be dispensed from a faucet according to this disclosure will demonstrate such precipitate issues. For dispensing of those fluids which do include such potential precipitates, sealing member 232 provides a much wider sealing surface against outer wall 178 and aids in the forming of a seal in spite of the presence of such material.

By providing a wider sealing surface, sealing member 232 also spreads the pressure forming the sealing over a greater surface. While the overall sealing force may remain the same, it is spread over a greater area, reducing the force per square inch. Greater pressure per unit area may cause vulcanization over time of the material from which the sealing member is formed and a reduction in the pressure per unit area may help reduce vulcanization, resulting in a longer useful life span for the sealing member.

Figure 50:
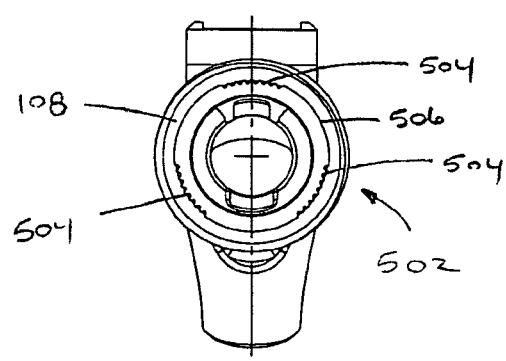
FIG. 50 is a rear view of a third alternative embodiment of a faucet body according to the present invention, with mounting splines positioned only about a portion of a circumference of a mounting opening.
Figure 51:
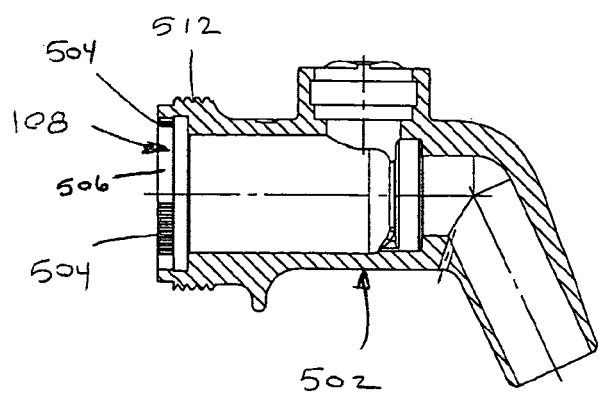
FIG. 51 is a side cross-sectional view of the faucet body of FIG. 50.

Adjacent rear end 108 of each of the faucets 102, 22, 302, and 402 may be a inner circumferential ring 508 of splines 510 which may be used to aid in the positioning and fixing of the faucets with respect to a mount. Such splines permit the faucets to be oriented as desired or required rotationally by engaging corresponding splines of the mount, and then fixed in that position by, for example, a lock ring threaded about threads 512, as shown in FIGS. 50 and 51. While such splines have been conventionally formed about the entire circumference of rear end 108 to engage such a splined mount, splines 510 may be formed discontinuously about such the inner circumference, as shown in alternative faucet body 502. Splines 510 in faucet body 502 are positioned about an inner circumference 506 of rear end 108 in three distinct segments 504. It is anticipated that more of fewer numbers of segments 504 can used within inner circumference 506 while still maintaining the ability to position and fix the position of faucet body 502 in mounting to a conventional mating splined mount.

Figure 52:
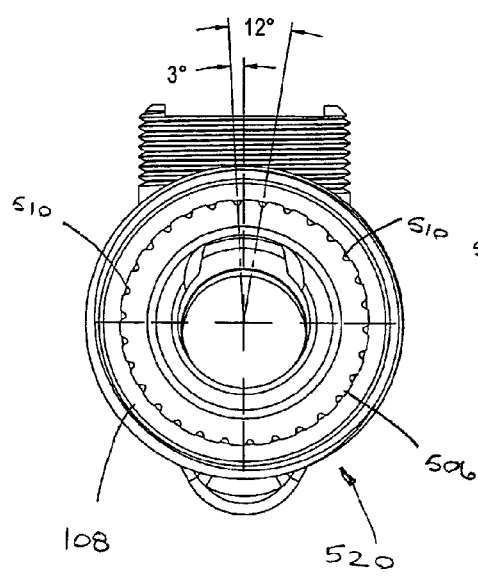
FIG. 52 is a rear view of a fourth embodiment of a faucet body according to the present invention, with circumferentially spaced splines positioned about a mounting opening.
Figure 53:
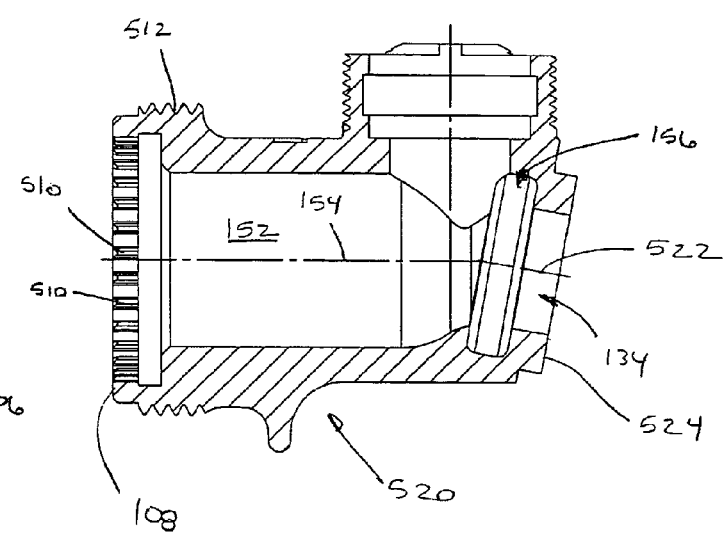
FIG. 53 is a side cross-sectional view of the faucet body of FIG. 52.

Another embodiment of a discontinuous arrangement of splines 510 is shown in FIGS. 52 and 53. An alternative faucet body 520 includes splines 510 which have been spaced apart at twice the distance form splines 510 of faucets 102, 202, 302 and 402. While the spleens do form a generally continuous ring about circumference 506, only half the number of splines 510 are included. It is anticipated that other regular multiples of the spacing of splines 510 may be used within the scope of this disclosure. Common spacing of splines of a conventional mount for receiving any of the faucets disclosed herein is generally six degrees between splines from center to center. As shown in FIGS. 52 and 53, the spacing of splines from center to center is generally twelve degrees.

Also shown in FIG. 53 is an alternative arrangement of a flow centerline or axis within faucet 520. As shown in faucets 102, 202, 302, and 402, above, flow centerline or axis 154 extends though central flow cavity 152. However, adjacent front opening 134, an intermediate flow centerline or axis 522 is defined, which is at an angle to flow centerline 154. Intermediate flow centerline 522 aids in the transition of fluid flowing generally parallel to flow centerline 154 with faucet body 520 and flowing generally parallel to flow centerline or axis 164 of a removable spout, such as spout 304, shown in FIG. 38, above. Smoothing the transition between flow within faucet body 520 and a spout such as spout 304 may aid in the delivery of fluid may reduce turbulence of the fluid being dispensed, which may in turn reduce unwanted foaming or other adverse affects. Note that faucet body 520 includes a front sealing surface 524 which is generally perpendicular to intermediate centerline 522. While front sealing surface 524 may be angled generally perpendicular to intermediate flow axis 522, other angled orientations of front sealing surface 524 are anticipated within the scope of the present invention and may be selected to aid in production or manufacture of faucets made according to the present invention.

Figure 54:
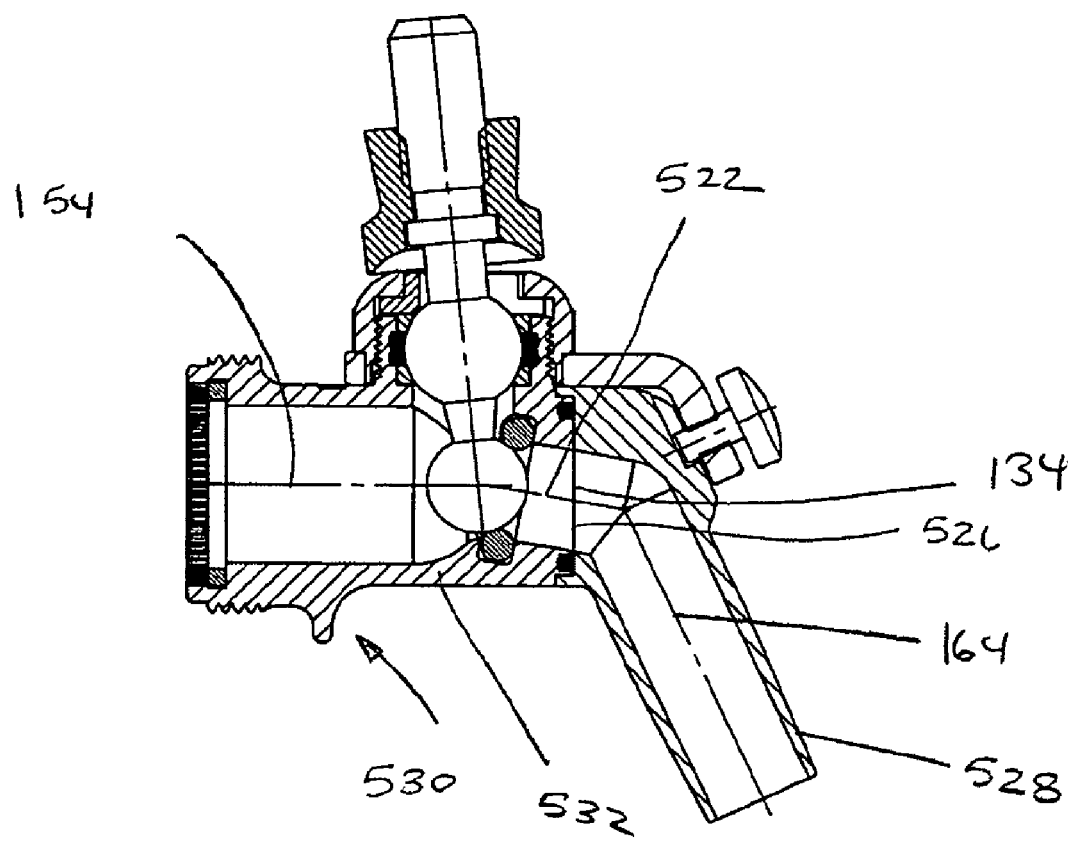
FIG. 54 is a side cross-sectional view of a fourth alternative embodiment of a faucet body according to the present invention, with an intermediate angled flow portion downstream of the floating seal.

An alternative faucet 530 is shown in FIG. 54, including a faucet body 532, with flow centerline 154 within cavity 152, and angled intermediate flow centerline 522 adjacent front opening 134. A front sealing surface 526 is provided which is generally perpendicular to flow centerline 154. A removable spout 528 is mounted front sealing surface 526 about opening 134 and defines flow centerline 164. Note how intermediate angled flow centerline 522 provides a less abrupt transition from flow parallel to centerline 154 within faucet body 532 and flow parallel to centerline 164 within spout 528.

Figure 55:
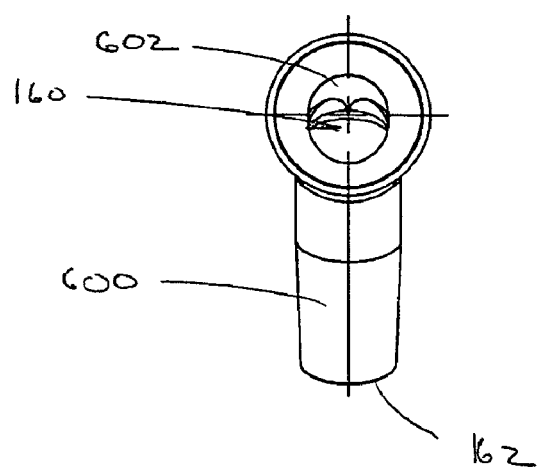
FIG. 55 is a rear view of a third alternative embodiment of a removable spout according to the present invention, with an intermediate angled flow portion downstream of the floating seal.
Figure 56:
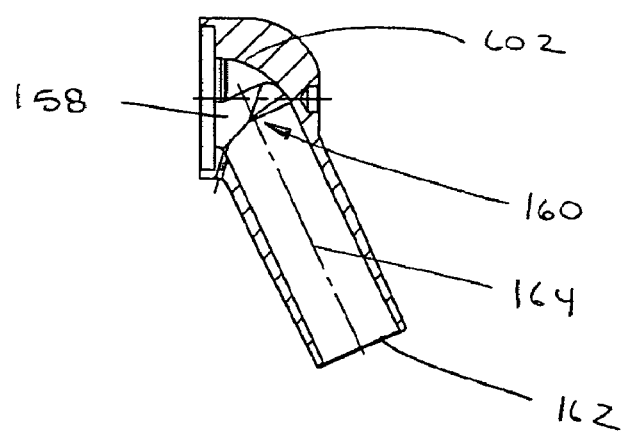
FIG. 56 is a side cross-sectional view of the removable spout of FIG. 54.

FIGS. 55 and 56 illustrate an alternative embodiment of a removable spout 600 which provides a slightly different approach to smoothing a fluid's transition from within a faucet body and flow within spout 600. Within spout 600 in transition zone 160, a more gradually or smoothly curved inner surface 602 is provided to aid in the transition of flow from generally parallel to flow centerline 154 within a faucet body and generally parallel to flow centerline 164 as fluid flows into first end 158 and out second end 162. The exact profile of the curvature of surface 602 may be a constant radius, an elliptical curve, or some other profile that may be matched to the characteristics of the fluid being dispensed.

Further alternative embodiments of removable spouts 610 and 620 are shown in FIGS. 57 and 58, and 59 and 60, respectively. Spouts 610 and 620 provide flow diverters generally positioned along flow centerlines to aid in the transition of fluid flow. In transition zone 160 of spout 610, a pair of flow diverters are provided, a first diverter 612 generally parallel to flow centerline 154, and a second flow diverter generally parallel to flow centerline 164. The two flow diverters may be joined as shown or may be configured to permit flow between. The flow diverters provide a centrally positioned surface or surfaces to aid the transition of flow within transition zone 160. It may be less than optimal to permit fluid flowing within spout 610 to rely solely on an outer surface 616 of transition zone 160 to provide redirection of flow toward centerline 164. The flow diverters 612 and 614 provide a centrally positioned surface to redirect at least a portion of fluid flowing through spout 610 and improve the pressure curve within spout 610. Similarly, spout 620 includes a single flow diverter 614, generally parallel to flow centerline 164 of spout 620.

Figure 61:
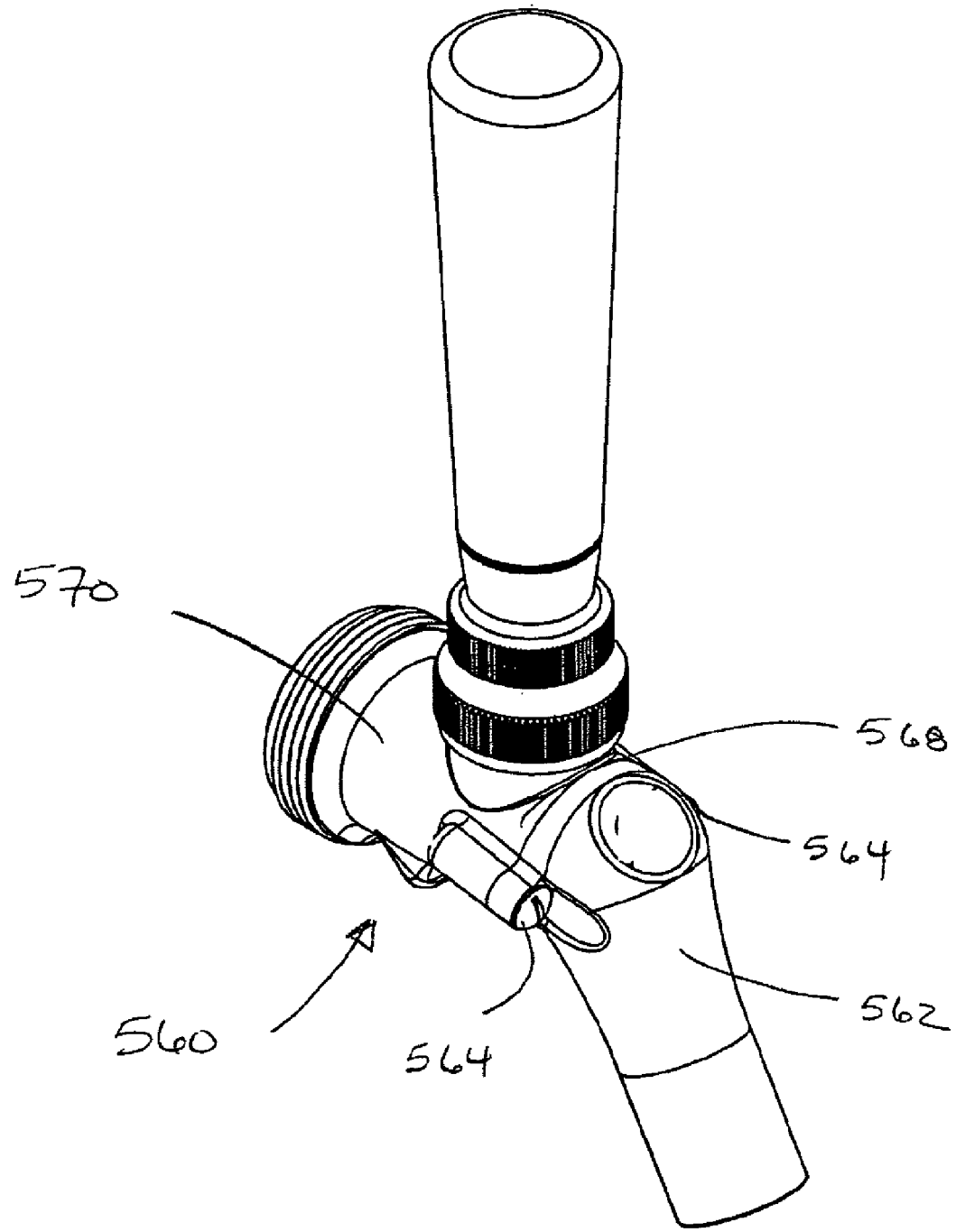
FIG. 61 is a perspective view of a fifth alternative embodiment of a faucet with a removable spout according to the present invention.

FIG. 61 illustrates a fifth alternative embodiment of a faucet 560 having a removable spout 562 mounted to a front end of the faucet. Faucet 560 is configured internally generally the same as prior described embodiments. One difference between faucet 560 and the earlier described embodiments is how removable spout 562 is fastened to a front end 568 of a faucet body 570. Removable spout 562 is removably attached to faucet body 570 by a pair of screws 564 extending through holes along opposite sides of spout 562 and engaging corresponding threaded openings of faucet body 570.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:
1. A faucet for dispensing pressurized liquids, the faucet comprising:
    a body with an open first end and an open second end, the body defining a cavity extending between the first and second ends;
    an lever opening extending into the cavity through the body between the first and second ends, a lever extending through the lever opening into the cavity, a distal end of the lever within the cavity and a proximal end of the lever outside the cavity;

the distal end of the lever movable between a first position blocking flow of a liquid through the cavity from the first end through the second end, and a second position permitting the liquid to flow through the second end;

the distal end of the lever configured to engage a sealing member within the cavity adjacent the second end in the first position, the sealing member positioned within a seat integral with the body within the cavity and providing a seal against the liquid exiting the second end;

the seat within the cavity substantially larger than the sealing member, so that when the lever is placed in the second position, the liquid may flow about the sealing member as it flows through the second end of the body the seat and sealing member further configured so that the sealing member is retained within the seat when the lever is placed in the second position.

2. The faucet of claim 1, wherein the lever is pivotably mounted within the lever opening and moving the distal end of the lever from the first position to the second position moves the proximal end of the lever in the opposite direction.

3. The faucet of claim 2, wherein the lever includes a spherical portion positioned between the distal and proximal ends, the spherical portion captively held within the lever opening of the body, and wherein movement of the distal end between the first and second positions rotates the lever about the spherical portion.

4. The faucet of claim 3, wherein a portion of the distal end of the lever engaging the sealing member is spherical in shape.

5. The faucet of claim 4, wherein the spherical shaped portion of the distal end of the lever may be inserted through the lever opening of the body.

6. The faucet of claim 4, wherein the lever includes a central spherical portion positioned between the distal and proximal ends, the central spherical portion captively held within the lever opening of the body, and wherein movement of the distal end between the first and second positions rotates the lever about the central spherical portion, wherein the spherical shaped portion of the distal end defines approximately the same radius as the central spherical portion, and wherein the distal end of the lever is sized to be inserted through the lever opening of the body.

7. The faucet of claim 1, wherein the sealing member is an o-ring.

8. The faucet of claim 1, wherein the sealing member is a ring with a rounded side positioned to engage the lever and a generally flat side opposite the rounded side, the flat side engaging the body.

9. The faucet of claim 1, further comprising a spout removably attached to the second end of body.

10. The faucet of claim 9, wherein the spout includes a first end adjacent the second end of the body, and a second end opposite the first end, wherein the cavity defines a first axis of flow for the liquid between the first and second ends of the body, and the second end of the spout defines a second axis of flow, with the first and second axes are angled with respect to each other.

11. The faucet of claim 10, the spout further comprising an interior through which the liquid may flow from the first end to the second end, the interior of the spout including a transition area where the liquid is turned from flowing generally parallel to the first axis to flowing generally parallel to the second axis adjacent the second end, the transition area having a vent extending through a wall of the spout and permitting air to enter the interior through the wall.

12. The faucet of claim 11, wherein the transition area includes an inner wall and an outer wall the vent is extends through the inner wall.

13. The faucet of claim 12, wherein the inner wall of the transition area defines a point of deflection between the first and second axes of flow and the vent is located between the point of deflection and the second end of the spout.

14. The faucet of claim 9, further comprising a releasable clip holding the removable spout to the second end of the body.

15. The faucet of claim 9, further comprising at least one removable fastener extending through the removable spout and engaging the body, holding the removable spout to the body.

16. The faucet of claim 9, further comprising a sealing member positioned between the removable spout and the second end of the body.

17. The faucet of claim 1, wherein the lever includes a pair of opposing flats adjacent the lever opening, and a u-clamp is positioned about the lever engaging the flats of the lever within the lever opening of the body, the u-clamp engaging the flats and preventing rotation of the lever about a longitudinal axis.

18. The faucet of claim 17, wherein the u-clamp includes a plurality of detent positions, a first detent positions corresponding to the first position of the lever and a second detent positions corresponding to the second position of the lever, the u-clamp configured to releasably hold the lever in one of the detent positions.

* * * * *